(12) United States Patent
Hilger

(10) Patent No.: US 9,267,643 B2
(45) Date of Patent: Feb. 23, 2016

(54) METHOD AND APPARATUS FOR GREASING A WHEEL BORE

(71) Applicant: Android Industries LLC, Auburn Hills, MI (US)

(72) Inventor: Thomas Hilger, Clarkston, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 14/304,586

(22) Filed: Jun. 13, 2014

(65) Prior Publication Data

US 2014/0370201 A1     Dec. 18, 2014

Related U.S. Application Data

(60) Provisional application No. 61/836,475, filed on Jun. 18, 2013.

(51) Int. Cl.

| | |
|---|---|
| *F16N 25/04* | (2006.01) |
| *B05C 1/10* | (2006.01) |
| *B05C 1/02* | (2006.01) |
| *F16N 99/00* | (2006.01) |
| *B05C 7/00* | (2006.01) |
| *F16N 7/14* | (2006.01) |
| *B05C 7/06* | (2006.01) |
| *F16N 7/12* | (2006.01) |
| *B05C 7/08* | (2006.01) |

(52) U.S. Cl.
CPC ............... *F16N 25/04* (2013.01); *B05C 1/022* (2013.01); *F16N 99/00* (2013.01); *B05C 7/00* (2013.01); *B05C 7/06* (2013.01); *B05C 7/08* (2013.01); *F16N 7/12* (2013.01); *F16N 7/14* (2013.01)

(58) Field of Classification Search
CPC ............ B05C 1/022; B05C 7/00; B05C 7/06; B05C 7/08; F16N 7/12; F16N 7/14; F16N 25/04; F16N 99/00
USPC ................. 118/214, 215, 254, 256, 258, 264; 184/101, 102
See application file for complete search history.

(56) References Cited

U.S. PATENT DOCUMENTS

| | | | | |
|---|---|---|---|---|
| 6,119,814 A | * | 9/2000 | Kane et al. | ..... 184/101 |
| 6,209,684 B1 | * | 4/2001 | Kane et al. | ..... 184/101 |
| 2009/0283221 A1 | * | 11/2009 | Lawson | ..... 157/1.17 |

\* cited by examiner

*Primary Examiner* — Laura Edwards
(74) *Attorney, Agent, or Firm* — Honigman Miller Schwartz and Cohn LLP

(57) ABSTRACT

A wheel lubricating device for lubricating at least a portion of a wheel, including: a lubrication applicator, a rotary drive mechanism at least indirectly coupled to said lubrication applicator, a lubrication supply conduit in fluid communication with said lubrication applicator, a transfer pump for transferring a lubricating medium through said lubrication supply conduit to said lubrication applicator.

5 Claims, 8 Drawing Sheets

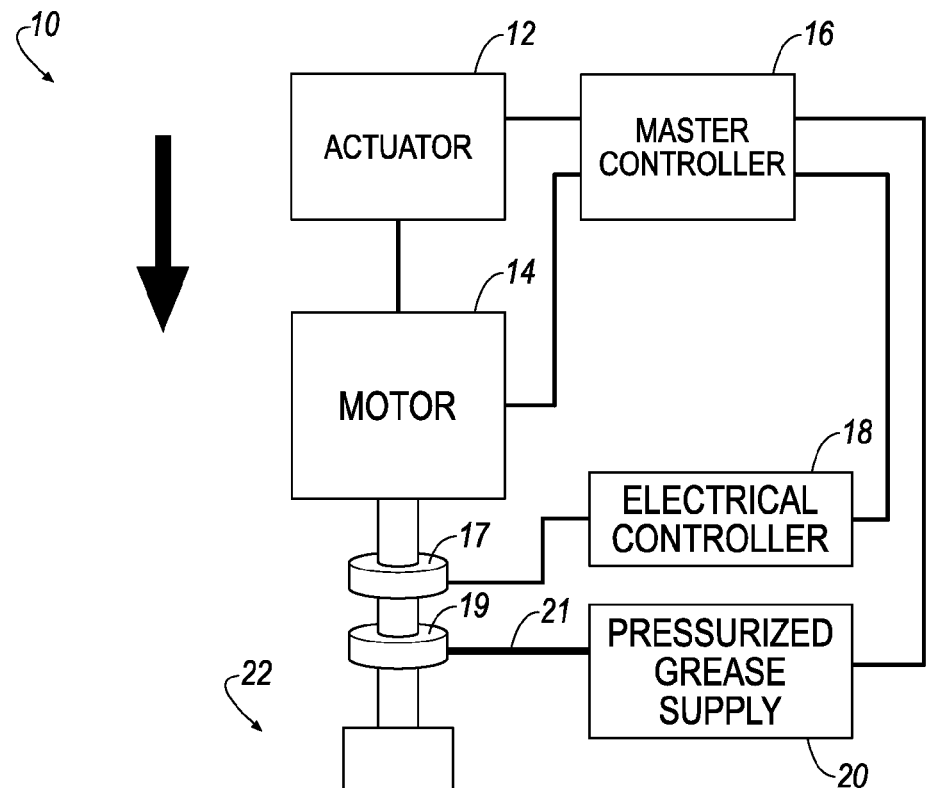
FIG. 4A
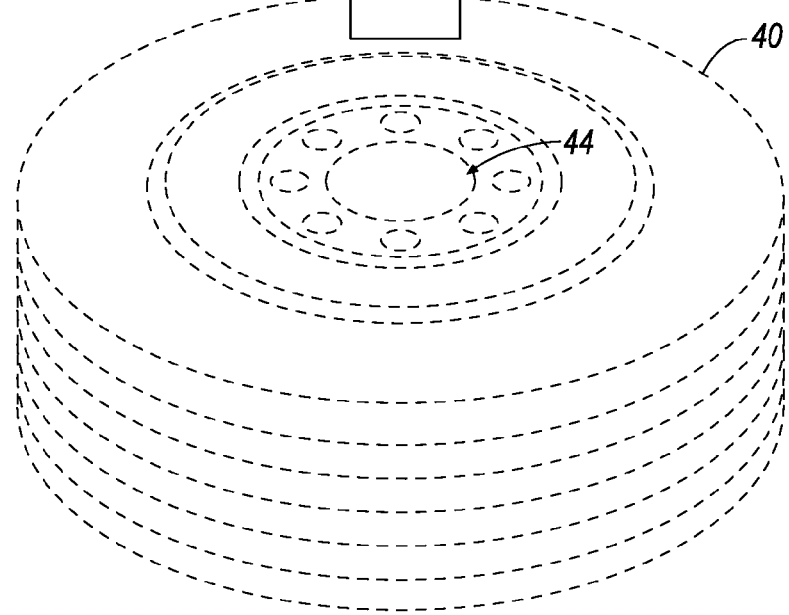

METHOD AND APPARATUS FOR GREASING A WHEEL BORE

RELATED APPLICATION

This U.S. patent application claims priority to U.S. Provisional Application 61/836,475 filed on Jun. 18, 2013.

TECHNICAL FIELD

This disclosure relates to an apparatus and method for greasing a wheel bore.

BACKGROUND

In order to facilitate the mounting and demounting of wheels onto a vehicle, grease may be applied to the bore of the wheel. The present disclosure relates to an apparatus and method for greasing a wheel bore.

DESCRIPTION OF DRAWINGS

FIGS. 4A-4E are schematics illustrating different states of the wheel bore greasing apparatus during operation of the same.

Like reference symbols in the various drawings indicate like elements.

DETAILED DESCRIPTION

Figure 1:
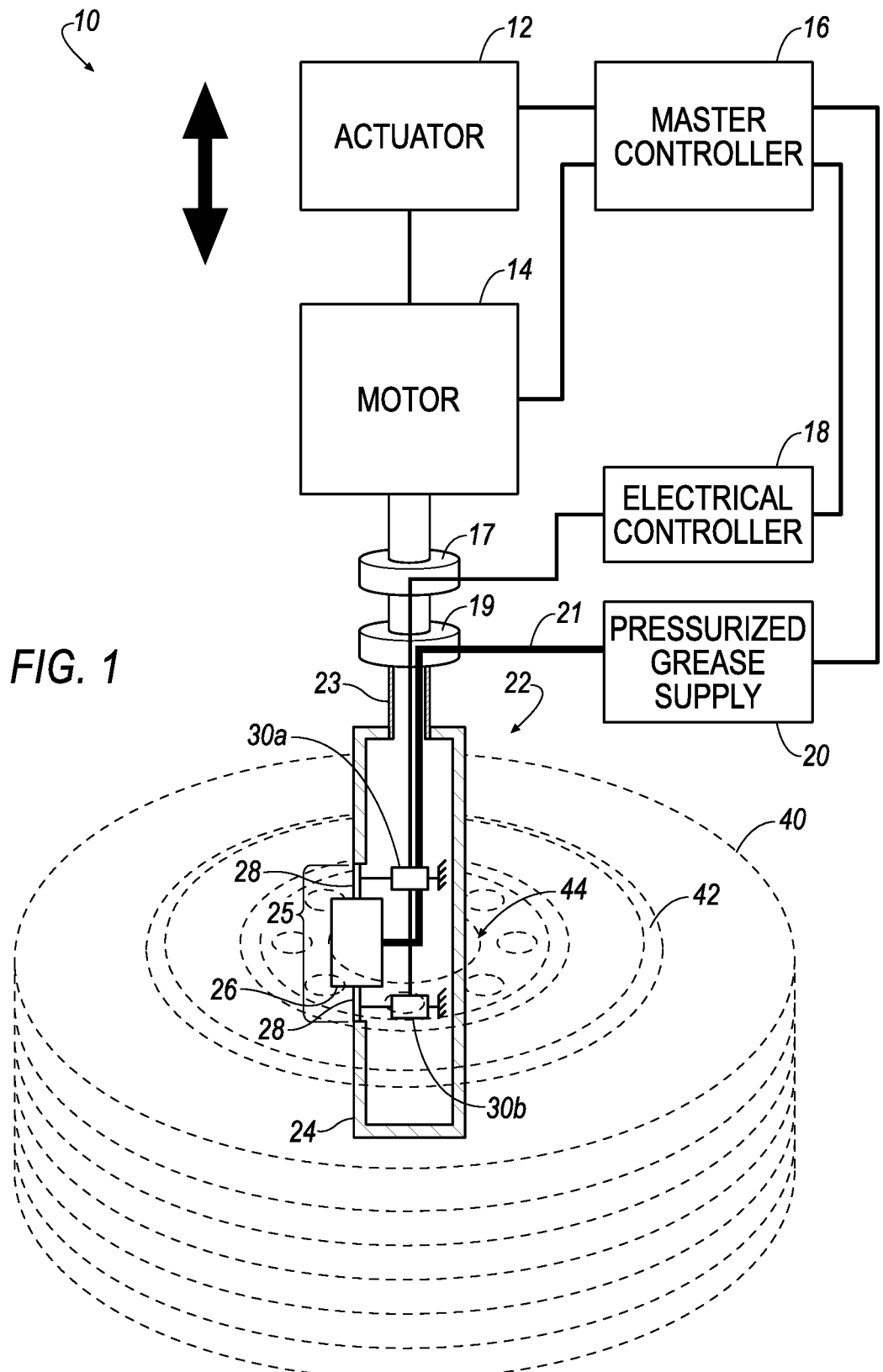
FIG. 1 is a schematic illustrating example components of a wheel bore greasing apparatus.

FIG. 1 illustrates an example wheel bore lubricating (greasing) apparatus 10. The wheel bore greasing apparatus 10 is configured to receive a wheel 40 and to apply a lubricant (such as grease) grease to a wheel bore 44 of the wheel 40 (located at the center of the wheel plate 42). In some implementations, the wheel bore greasing apparatus 10 can include an actuator 12, a rotary drive mechanism (such as a rotary electric, hydraulic, or pneumatic motor) 14, a master controller 16, an electrical controller 18, a lubricant (grease) supply 20, a lubrication supply conduit (such as supply line) 21, and a lubrication applicator (such as a grease roller assembly) 22. In an embodiment, the grease roller assembly 22 can include a shaft 23, a support structure 24 having an aperture 25 defined along a lateral surface 27 of the support structure 24, a roller 26 having at least one axle 28, and one or more roller axle actuators 30a and 30b (herein referenced by reference number 30). The wheel bore greasing apparatus may include additional components not depicted in FIG. 1. For instance, the wheel bore greasing apparatus 10 may include a conveyor belt or any other suitable mechanism for placing the wheel 40 in position to be greased by the wheel bore greasing apparatus 10.

The master controller 16 is configured to grease the wheel 40 by controlling the actuator 12, the motor 14, the electrical controller 18, and the grease supply 20. The master controller 16 may include one or more processors and a non-transitory computer readable medium storing machine-readable instructions that are executed by the one or more processors. The master controller 16 can determine when the wheel 40 is in a position to be greased. When the wheel 40 is the position to be greased, the master controller 16 commands the actuator 12 to drive the grease roller assembly 22 into a greasing position, and the motor 14 to rotate the grease roller assembly 22. Prior to and/or while the motor 14 is rotating the grease roller assembly 22, the master controller 16 can command the lubrication transfer mechanism to pump lubricant through supply conduit 21, and release lubrication medium (grease) onto the roller 26. In some implementations, the master controller 16 may further command the electrical controller 18 to activate the roller axle actuators 30, thereby driving the roller 26 into a position to grease the wheel bore 44, whereby the command is provided prior to commanding the motor 14 to rotate the grease roller assembly 22.

The actuator 12 may control the vertical movement of the grease roller assembly 22. The actuator 12 is coupled (directly or indirectly) to the shaft 23 of the grease roller assembly 22. Upon receiving a signal from the master controller 16, the actuator 12 drives the shaft 23 in a downward direction (towards the wheel bore 44) until the grease roller assembly 22 is in a greasing position. The greasing position can refer to a position whereby the grease roller assembly 22 is positioned proximate the wheel bore 44 and the roller 26 is in line with the wheel bore 44. In some implementations, the greasing position may refer to a position whereby the grease roller assembly 22 is positioned inside the wheel bore 44 and the roller 26 forcibly abuts the wheel bore 44. When the greasing operation is completed, the actuator 12 retracts the grease roller assembly 22 from the greasing position in an upward direction (away from the wheel bore 44).

The motor 14 controls the rotational movement of the grease roller assembly 22. The motor 14 is coupled (directly or indirectly) to the shaft 23 of the grease roller assembly 22. In an embodiment, the master controller 16 may send an electrical command signal to motor 14 which, in turn, starts to rotate the shaft about its vertical axis. The motor 14 can continue to rotate until the signal is turned off by the master controller 16.

The grease supply 20 stores grease and supplies the grease to the roller 26. In some implementations, the grease supply 20 is a pressurized reservoir controlled by the master controller 16. In some implementations, the grease supply 20 receives a signal from the master controller 16 to open a valve that obstructs the flow of the grease from the reservoir to the grease supply line 21. Upon receiving the signal, the grease supply 20 can open a valve, thereby allowing the grease to flow from the reservoir to a proximate end of the grease supply line 21. Additionally or alternatively, the grease supply 20 may include a transfer mechanism (such as a pump) that is controlled by the master controller 16, whereby the master controller 16 commands the pump to pump grease into the grease supply line 21. The grease supply line 21 can be positioned such that its distal end 21 feeds the grease onto the lubrication applicator 26. The grease supply 20 can continue to supply grease, i.e., grease is flowing to the grease supply line 21, until the master controller 16 turns the signal to the grease supply 20 off.

The electrical controller 18 can control the roller axle actuators 30. Upon controlling the actuator 12 to drive the grease roller assembly 22 into the wheel bore 44, the master controller 16 can provide a signal the electrical controller 18 to control the roller axle actuators 30 to drive the roller 26 towards the wheel bore 44. In particular, the roller axle actuators 30 can drive the roller 26 from a first position where the roller 26 is contained within the perimeter of the support structure 24 to a second position where the roller 26 is positioned such that it is at least partially protruding from the aperture 25 in the support structure 24 and abutting the wheel bore 24.

Figure 2:
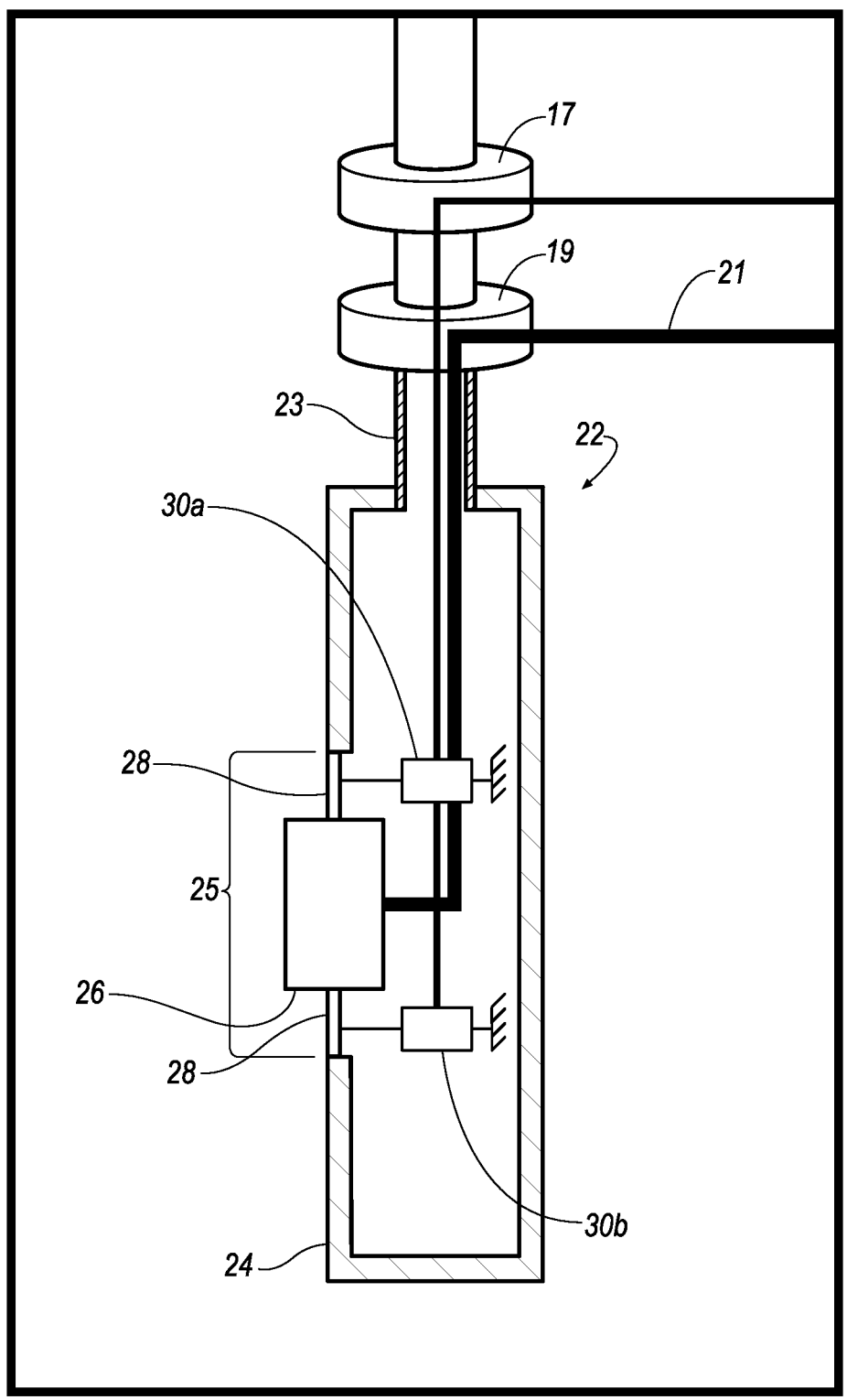
FIG. 2 is a schematic illustrating an example grease roller assembly.

Referring now to FIG. 2, a grease roller assembly 22 according to some implementations of the present disclosure is illustrated. As discussed the grease roller assembly 22 can include a shaft 23, a support structure 24 having an aperture 25 defined along a lateral surface 27 of the support structure 24, a roller 26 having at least one axle 28, and one or more roller axle actuators 30.

In some implementations, the shaft 23 couples to the motor 14 and actuator 12 via a first slip ring arrangement 17 and a second slip ring arrangement 19. The first slip ring arrangement 17 allows power to be delivered from the electrical controller to the grease roller assembly 22. The second slip ring arrangement 19 allows grease to be supplied from the grease supply 20 to the roller 26. The shaft 23 may be fixedly coupled to the slip ring arrangements or may be arranged in a telescoping manner, such that the actuator drives the shaft 23 in and out of the one or more slip ring arrangements.

In some implementations, the support structure 24 is a substantially cylindrical body with an aperture 25 defined along a lateral surface 27 of the support structure 24. The support structure 24 houses the roller 26, the grease supply line 21, and the roller axle actuators 30. The aperture 25 has sufficient size to allow at least a portion of the roller 26 to extend outside the outer perimeter of the support structure 24. The support structure 24 may be constructed of any suitable material, e.g., metal, steel, high density rubber, or high density plastic. The support structure 24 also includes an opening 32 at its upper end, the opening receiving the grease supply line 21 and any other wires or supply lines. The support structure 24 may be positioned relative to the shaft 23 either concentrically or off-center. In the former scenario, the support structure 14 rotates about its central vertical axis when rotated by the motor 14. In the latter scenario, the support structure 14 rotates about the rotation axis of the shaft 23.

The roller 26 is a body that is rolled about its axis while forcibly engaging the wheel bore 44. The roller 26 may be constructed of any suitable material, e.g., high density plastic or rubber, foam, porous medium, or the like. The grease supply line 21 coats the roller 26 with grease which, by virtue of the roller 26 rolling along the wheel bore 44, is ultimately applied to the wheel bore 44. The roller 26 may include a cavity extending through its vertical axis that receives the axle 28. The axle 28 is rotatably coupled to one or more roller axle actuators 30, which drive the roller 26 through the aperture 25 and against the wheel bore 44. In an embodiment, when the motor 14 rotates the grease roller assembly 22, the roller 26 rotates about the axle 28 while remaining forcibly pressed against the wheel bore 44. In other embodiments, the lubrication applicator does not rotate about an axle 28, but, rather it is non-rotatably fixed to support structure 24.

The wheel bore greasing apparatus 10 and the grease roller assembly 22 may contain additional or alternative components. Such implementations are contemplated and do not depart from the scope of the disclosure.

Figure 3:
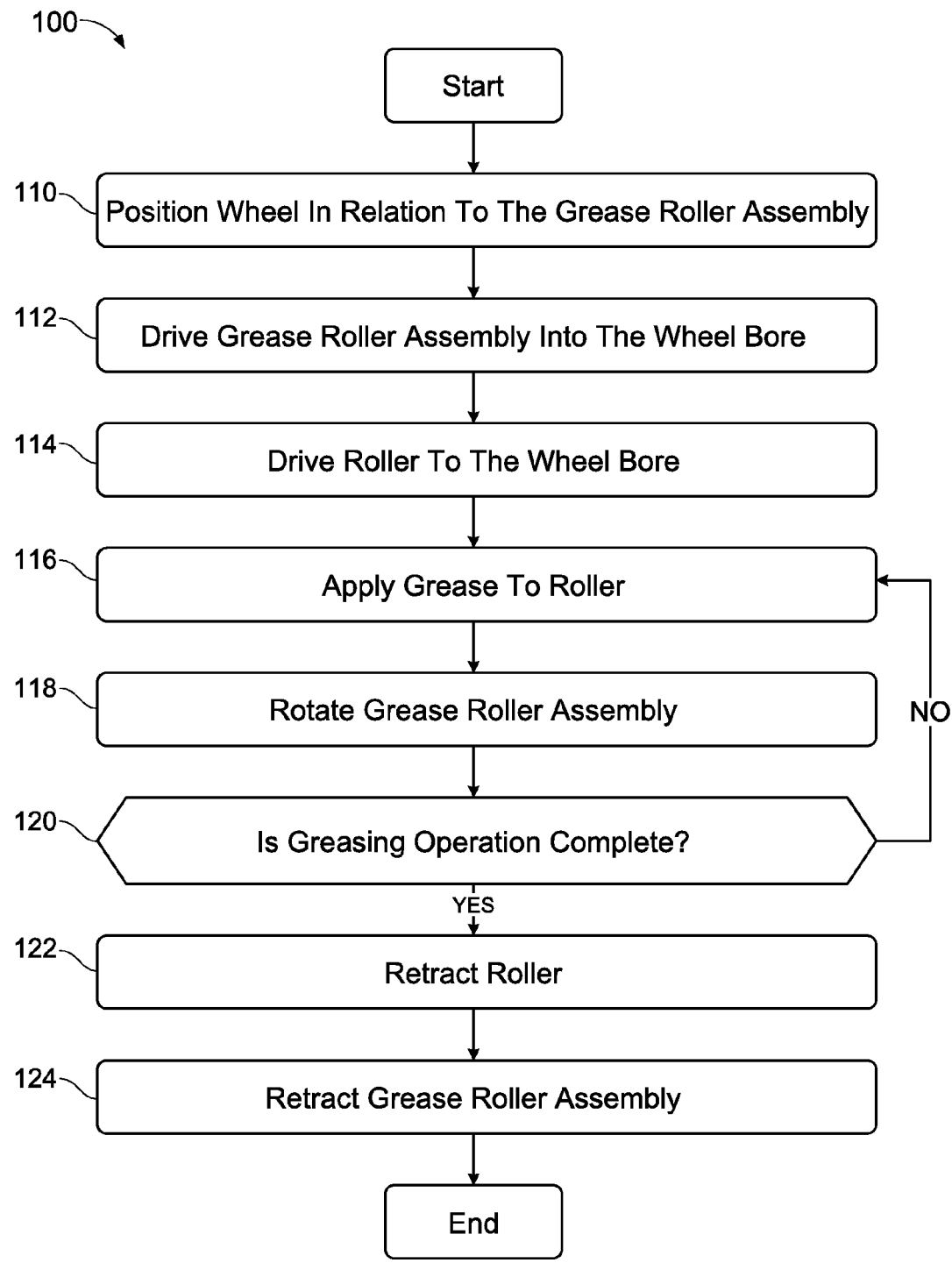
FIG. 3 is a flow chart illustrating an example set of operations for a method for operating a wheel bore greasing apparatus.

FIG. 3, depicts an example set of operations for a method 100 for operating the wheel bore greasing apparatus 10. Reference is made to FIGS. 4A-4E during the discussion of the method 100.

At operation 110, the wheel bore greasing apparatus 10 positions the wheel 40 in relation to the grease roller assembly 22. As previously discussed, the wheel bore greasing apparatus 10 may include a conveyor belt or another mechanism that positions the wheel 40 relative to the grease roller assembly 22. As shown in FIG. 4A, the wheel 40 is positioned such that the center of the wheel bore 44 is substantially in line with the vertical rotation axis of the grease roller assembly 22. At this juncture, the grease roller assembly 22 is in an "up" position.

Figure 4B:
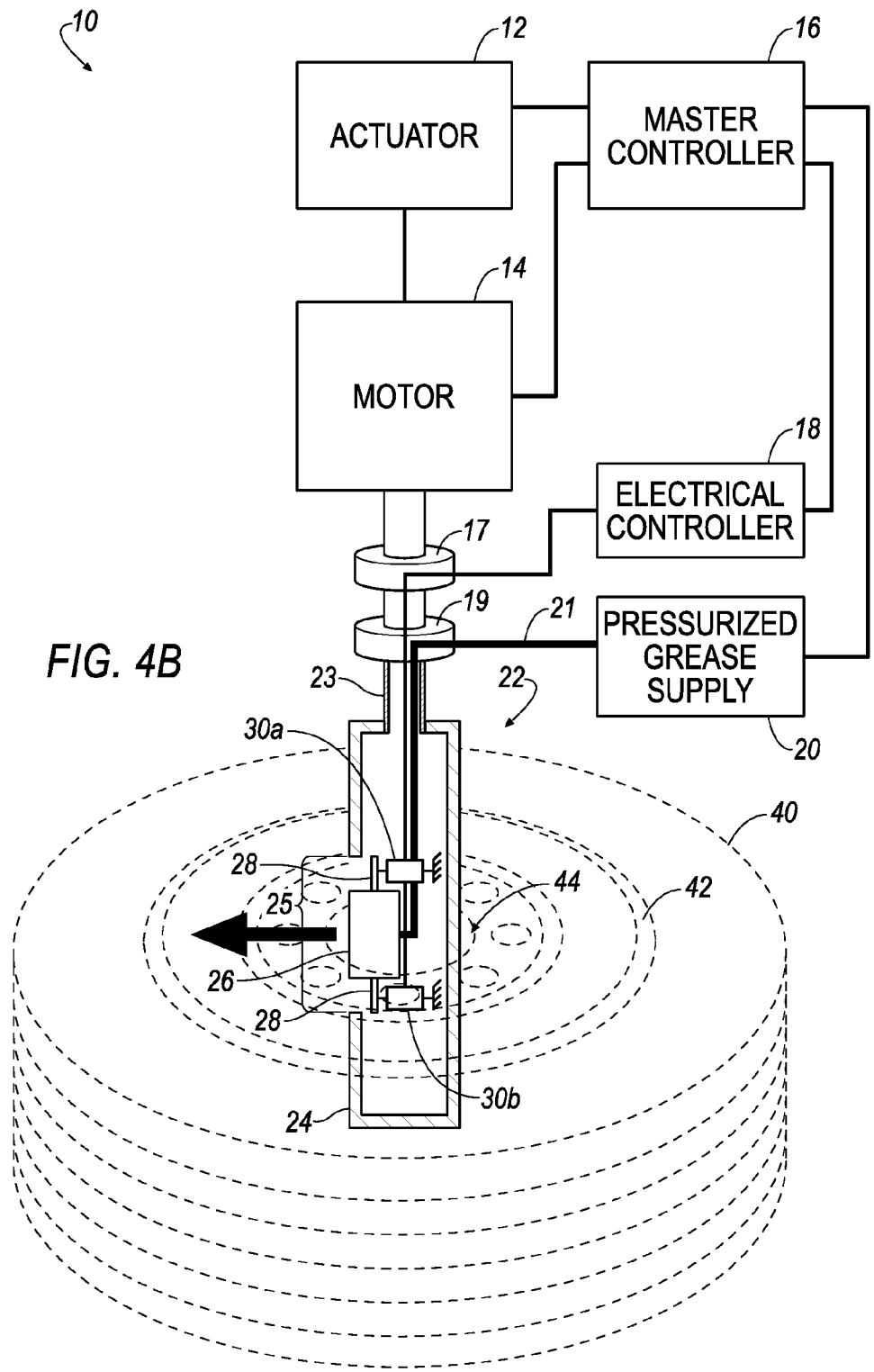

At operation 112, the actuator 12 drives the grease roller assembly 22 into the wheel bore 44. As mentioned, the actuator 12 is controlled by the master controller 16. Thus, the master controller 16 may provide an on signal to the actuator 12, which in turn drives the grease roller assembly 22 in a downward direction and into the wheel bore 44. At operation 114, the roller axle actuators 30 drive the roller 26 in an outward direction and to the wheel bore 44, such that the roller 26 forcibly abuts the wheel bore 44. The master controller 16 can provide an on signal to the electrical controller 18, which in turn controls the roller axle actuators 30 to drive the roller 26 towards the wheel bore 44. As shown in FIG. 4B, the grease roller assembly 22 is in the wheel bore 44 and being driven in an outwardly direction. In particular, the grease roller assembly 22 is positioned such that the roller 26 is in line with the wheel bore 44 and the roller axle actuators 30 are driving the roller 26 through the aperture 25.

Figure 4C:
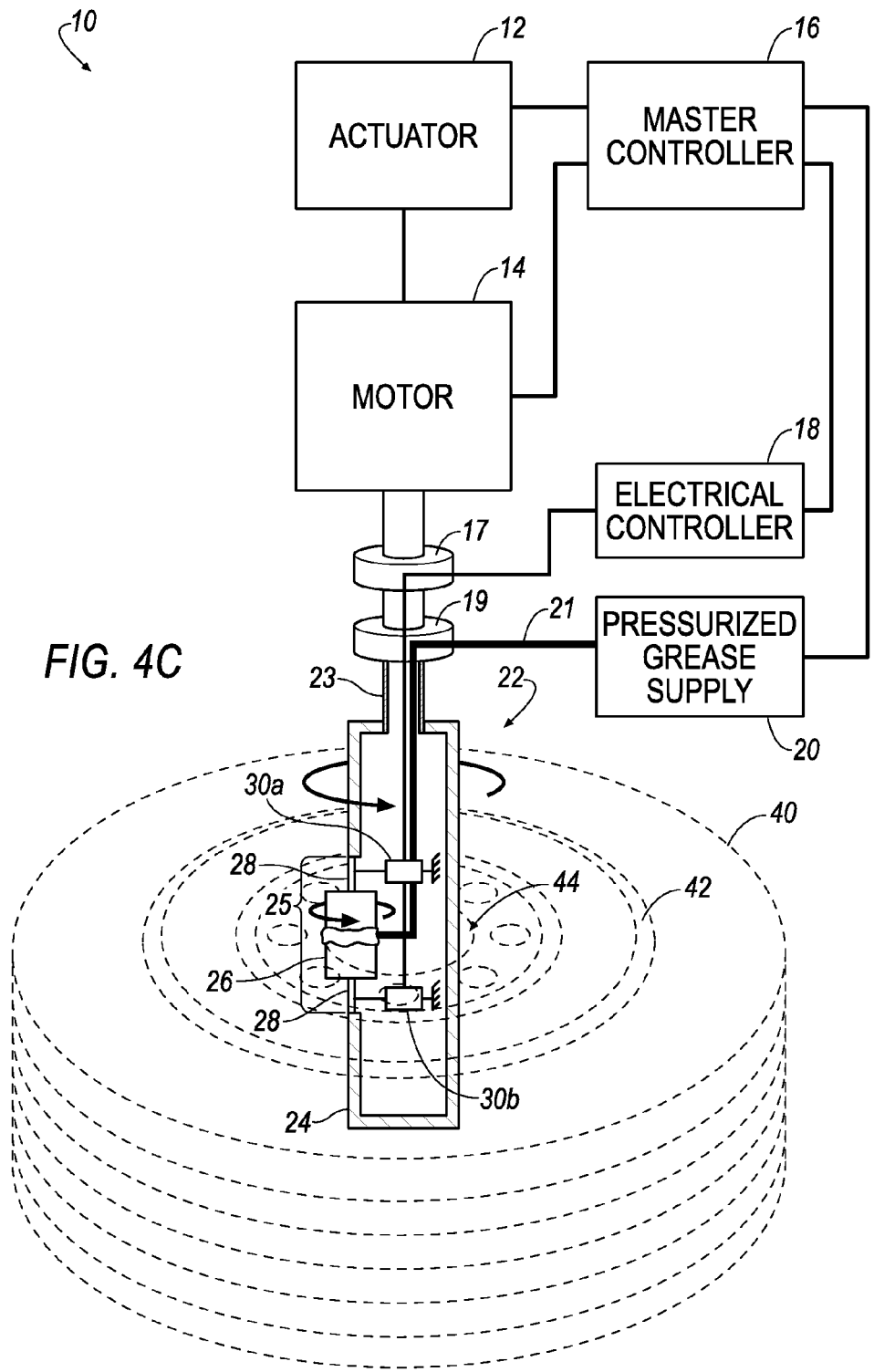

At operation 116 grease supply 20 applies grease to the roller 26 and at operation 118 the motor 14 rotates the grease roller assembly 22. The master controller 16 can provide an on signal to the grease supply 20, which causes the grease supply 20 to apply grease to the roller 26 via the grease supply line 21. The master controller 16 may also provide an on signal to the motor 14, which causes the motor 14 to rotate until the on signal is switched to off. FIG. 4C illustrates an example of a greasing operation being performed. In this example, the roller 26 is coated with grease and the motor 14 is rotating the assembly 22. As the grease roller assembly 22 rotates, the roller 26 rolls about the axle 28 and the lateral surface of the roller 26 rotates along the wheel bore 44. As the roller 26 rolls along the wheel bore 44, the grease that was applied to roller 26 is rolled onto the wheel bore 44, thereby greasing the wheel bore 44. The wheel bore greasing apparatus 10 can continue to operate in this manner until the greasing operation is complete, as shown at operation 120. A greasing operation may be completed after the motor 16 performs a predetermined amount of rotations. For example, a greasing operation may be completed after two full rotations.

Figure 4D:
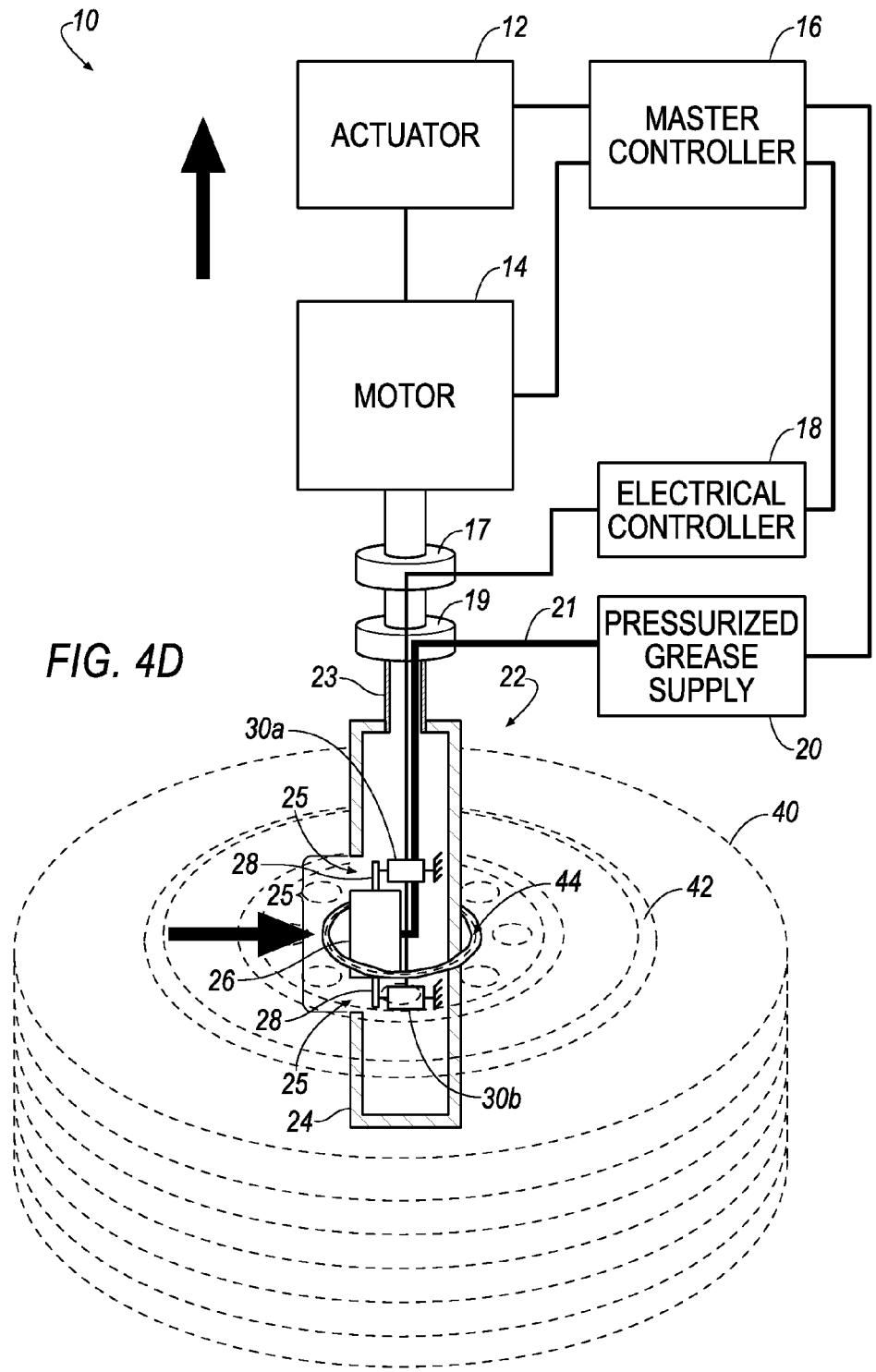
Figure 4E:
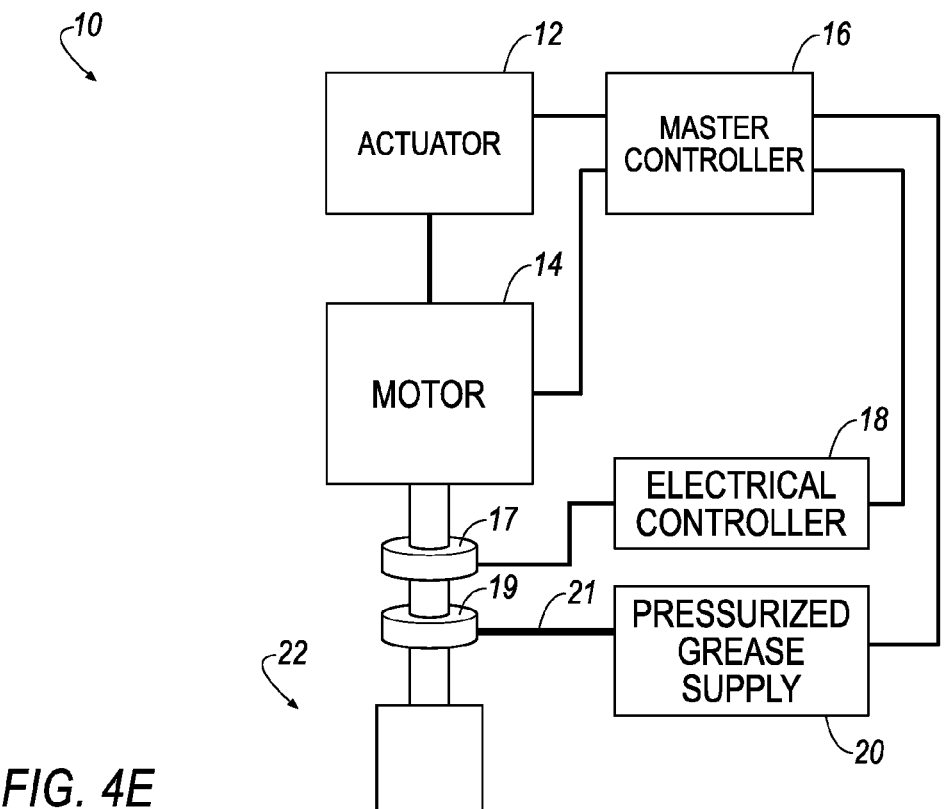
Figure 4E:
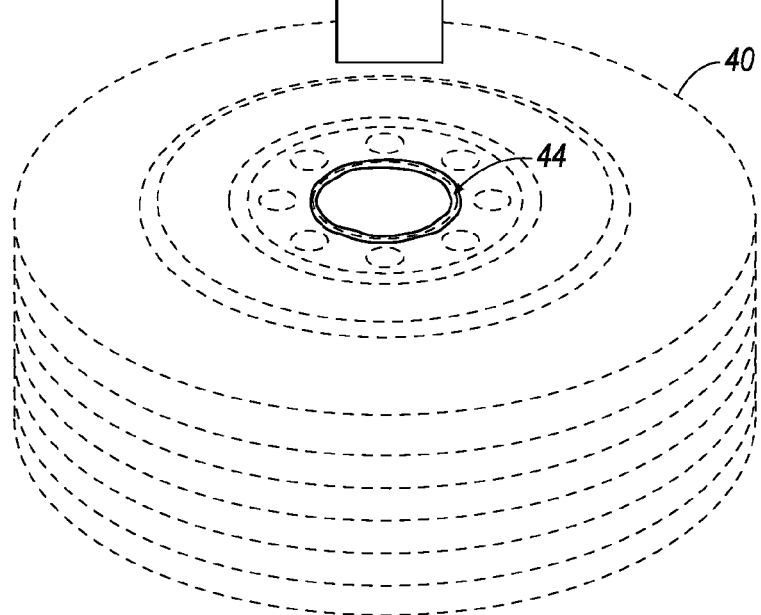

At operation 122 the roller axle actuators 30 retract the roller 26 and at operation 124 the actuator 12 retracts the grease roller assembly 22. As shown in FIG. 4D, the roller 26 is retracted in an inward direction, i.e., back into the grease roller assembly 22. Furthermore, the grease roller assembly 22 is retracted in an upward direction, such that it is removed from the wheel bore 44. As shown in FIG. 4E, the wheel bore 44 has been greased and the grease roller assembly 22 has been removed from the wheel bore 44. The wheel 40 can be removed and a new wheel 40 can be placed in its place.

The method of FIG. 3 is provided for example only. Variations of the method are contemplated and do not depart from the scope of the disclosure.

What is claimed is:
1. A wheel bore greasing apparatus, comprising:
a grease roller assembly including:
a support structure having
an upper end,
a lower end,
a lateral surface extending from the upper end to the lower end, and
an aperture formed by the lateral surface;
a roller joined to the grease roller assembly, wherein the roller is radially aligned with the aperture;

a motor coupled to the grease roller assembly that is configured to rotate the grease roller assembly about an axis;

a grease supply; and a grease supply line having a first end coupled to the grease supply and a second end configured to deposit grease from the grease supply onto the roller;

an axle interposed in the roller, wherein the roller rotates about the axle;

at least one roller axle actuator coupled to the axle, wherein the at least one roller axle actuator radially drives the roller from a first retracted position within the support structure to a second deployed position at least partially exterior of the support structure; and an actuator that is configured to impart axial movement to the grease roller assembly relative to a wheel bore in order to arrange the grease roller assembly for radial abutment with the wheel bore upon actuation of the at least one roller actuator for radially driving the roller from the first retracted position within the support structure to the second deployed position at least partially exterior of the support structure.

2. A wheel lubricating device, comprising:

a grease roller assembly including a support structure having
- an upper end,
- a lower end,
- a lateral surface extending from the upper end to the lower end, and
- an aperture formed by the lateral surface;

a lubrication applicator disposed within and movably-connected to the support structure, wherein the lubrication applicator is sized for movement through the aperture from a first retracted position within the support structure to a second deployed position at least partially exterior of the support structure;

a rotary drive mechanism at least indirectly coupled to said lubrication applicator;

a lubrication supply conduit in fluid communication with said lubrication applicator;

a transfer mechanism for transferring a lubricating medium through a grease supply conduit and then upon said lubrication applicator, wherein said lubrication applicator is non-rotatably fixed to the support structure;

at least one roller axle actuator coupled to the axle, wherein the at least one roller axle actuator radially drives the lubrication applicator from the first retracted position within the support structure to the second deployed position at least partially exterior of the support structure; and an actuator that imparts axial movement to the grease roller assembly.

3. The device of claim 2 wherein the rotary drive mechanism is an electrically powered motor.

4. The device of claim 2 wherein said lubrication applicator is comprised of a porous medium.

5. The device of claim 2 wherein said lubrication applicator is rotatably coupled to an axle that extends through the lubrication applicator, wherein the lubrication applicator rotates about the axle when the grease roller assembly is rotated.

* * * * *